Sept. 13, 1966   A. R. HUBBARD   3,271,799
ADHESIVE ACTIVATOR FOR SHOE LASTING MACHINES
Filed June 9, 1965   4 Sheets-Sheet 3

Sept. 13, 1966  A. R. HUBBARD  3,271,799
ADHESIVE ACTIVATOR FOR SHOE LASTING MACHINES
Filed June 9, 1965  4 Sheets-Sheet 4
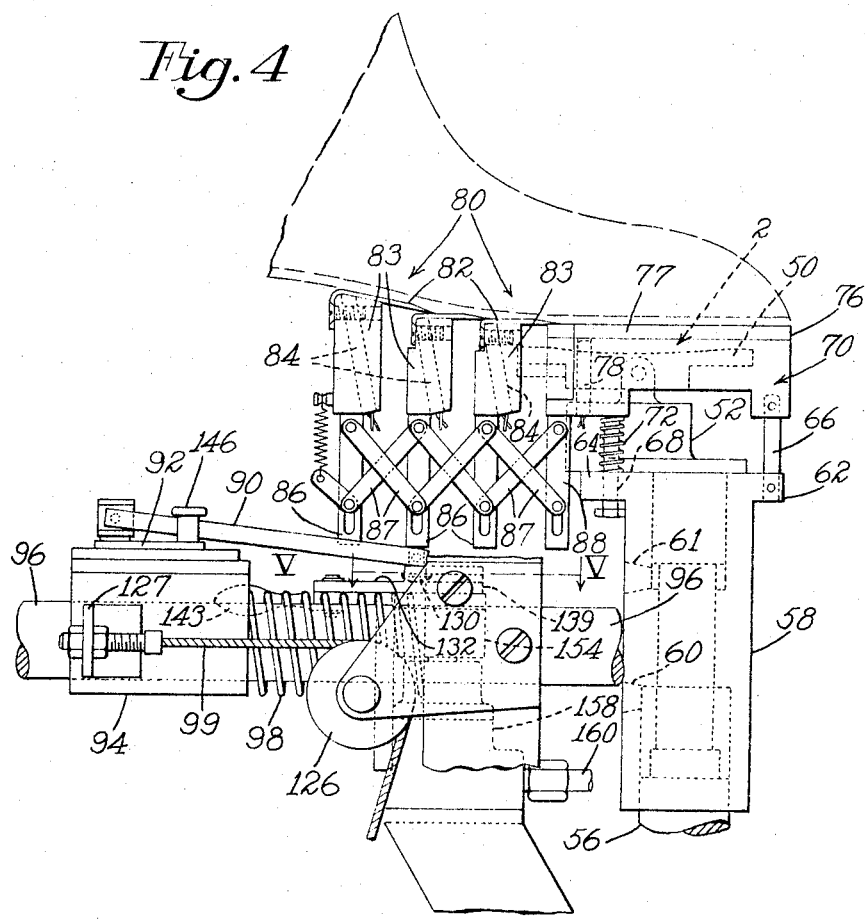
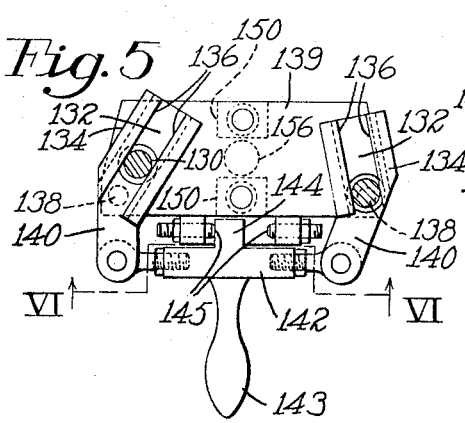
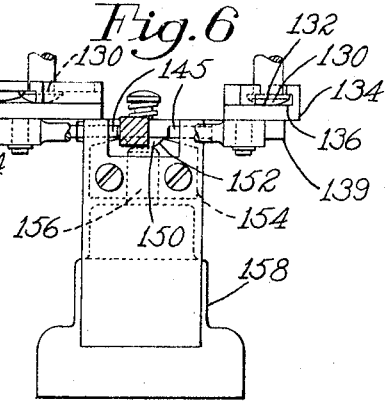

United States Patent Office

3,271,799
Patented Sept. 13, 1966

3,271,799
ADHESIVE ACTIVATOR FOR SHOE
LASTING MACHINES
Arthur R. Hubbard, Beverly, Mass., assignor to United
Shoe Machinery Corporation, Boston, Mass., a corporation of New Jersey
Filed June 9, 1965, Ser. No. 462,602
14 Claims. (Cl. 12—12)

This invention relates generally to machines for lasting shoes and more particularly is directed to means for activating precoated thermoplastic adhesive on the insole of a shoe during a lasting operation. A typical machine to which the invention may be applied is shown in U.S. Patent No. 3,164,852, granted January 12, 1965, upon application of R. M. Bowler et al. It is to be understood, however, that the scope of the present invention is not limited to the particular mechanism or the organization shown.

Due to their superior characteristics thermoplastic adhesives have found increasing use in the lasting of shoes particularly in securing the margins of lasted shoe uppers to the undersides of insoles. Since such adhesives set almost instantaneously when cooled below a critical molten temperature range, it is not necessary to hold the shoe upper in lasted condition for long periods of time to insure that bonding of the upper to the insole bottom is complete. Sufficient cooling of the adhesive below such range usually occurs rapidly when the relatively cool upper margins are engaged with molten adhesive on the insole margin. However, before the adhesive cools to setting temperature it acts as a lubricant greatly facilitating the lasting operation before it sets.

One method of lasting shoes using thermoplastic adhesive requires that the margin of the insole be precoated with the adhesive which generally is allowed to solidify before placement in a lasting machine. Since the so-called "open time," that is the time during which the adhesive remains molten, is so short due to the critical temperature range involved, there is insufficient time for a lasting machine operator either to activate the precoated adhesive or to apply the adhesive in a molten state outside the machine and thereafter place the shoe in the machine, adjust the position of the upper, and cause the machine to perform the lasting operation before the adhesive has set or solidified. Thus machines of this type have been provided with means for heat activating the precoated thermoplastic adhesive in the machine while the lasting operation is being performed.

It has been found that one of the most efficient and practical means of activating such adhesive involves contact of a heated surface directly upon the precoated adhesive. Such direct contact is possible and practical for activating on the bottom of the generally flat forepart of the insole where curvatures are not severely variable. However, the ball regions of shoes vary considerably by size and style both as to distance from the toe where heightwise curvature starts and as to the sharpness of the curvature. For this reason it was considered impractical to use thermoplastic adhesive at the ball region even though marked advantages could be obtained. Thus use of such adhesives were restricted to the lasting of the forepart of shoes where the generally flat contours could be engaged by solid heated plates.

Accordingly, it is a general object of the invention to extend the advantages of thermoplastic adhesive to the lasting of the ball region of shoes by providing means for activating precoated thermoplastic adhesive in such regions by direct contact with heated surfaces. To this end, the machine is provided with flexible heated surfaces which are capable of being easily varied in shape and disposition to conform substantially to the contours at opposite sides of the shoe bottom along the ball region.

In accordance with one feature, the heated activating surfaces are formed by series of flexible plates having overlapping ends so as to be adjustable lengthwise of the shoe according to its size. Another feature provides means for also setting the widthwise disposition of the surfaces according to shoe size. To these ends the plates each are carried by individual heating blocks which at opposite sides of the ball region of the shoe bottom are linked together to maintain equal spacing so the surfaces formed by the plates are uniformly lengthened or shortened according to shoe size. At least one of the blocks at each side is guided along a gradient line converging toward the forepart center line of the shoe so, as the blocks are moved lengthwise during their size setting movement, they are also moved widthwise predetermined distances according to shoe size.

According to further features, the blocks and their associated surfaces are selectively settable lengthwise independent of their size setting movement to vary the length and position of the activating surfaces according to whether a right or left shoe is to be operated on. In addition, the gradient lines of the widthwise guiding means converge differently so the widthwise locations of the activating surfaces also are disposed suitably for right or left shoes. To this end the guide means also are selectively settable to invert the disposition of the gradient lines for operating alternately on right or left shoes.

The above and other features of the invention together with novel details of construction and combinations of parts will now be described with reference to the drawings and thereafter particularly pointed out in the claims.

In the drawings,

FIG. 4 is a side elevation of a portion of the mechanisms shown in FIG. 3;

FIG. 5 is a section substantially on line V—V of FIG. 4; and

FIG 6 is a section on line VI—VI of FIG. 5.

Figure 1:
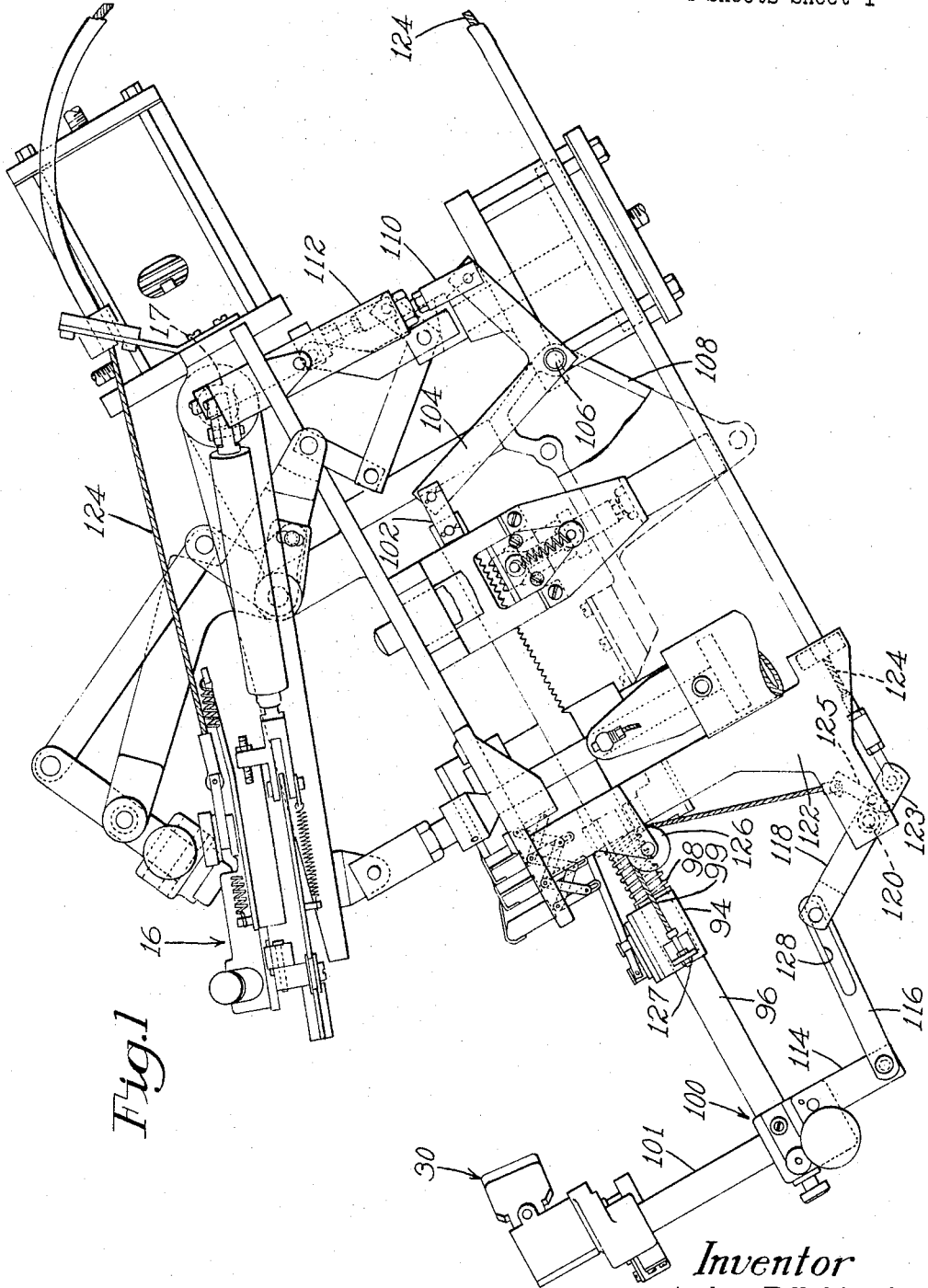
FIG. 1 is a side elevation of a pulling and lasting machine embodying the present invention.
Figure 2:
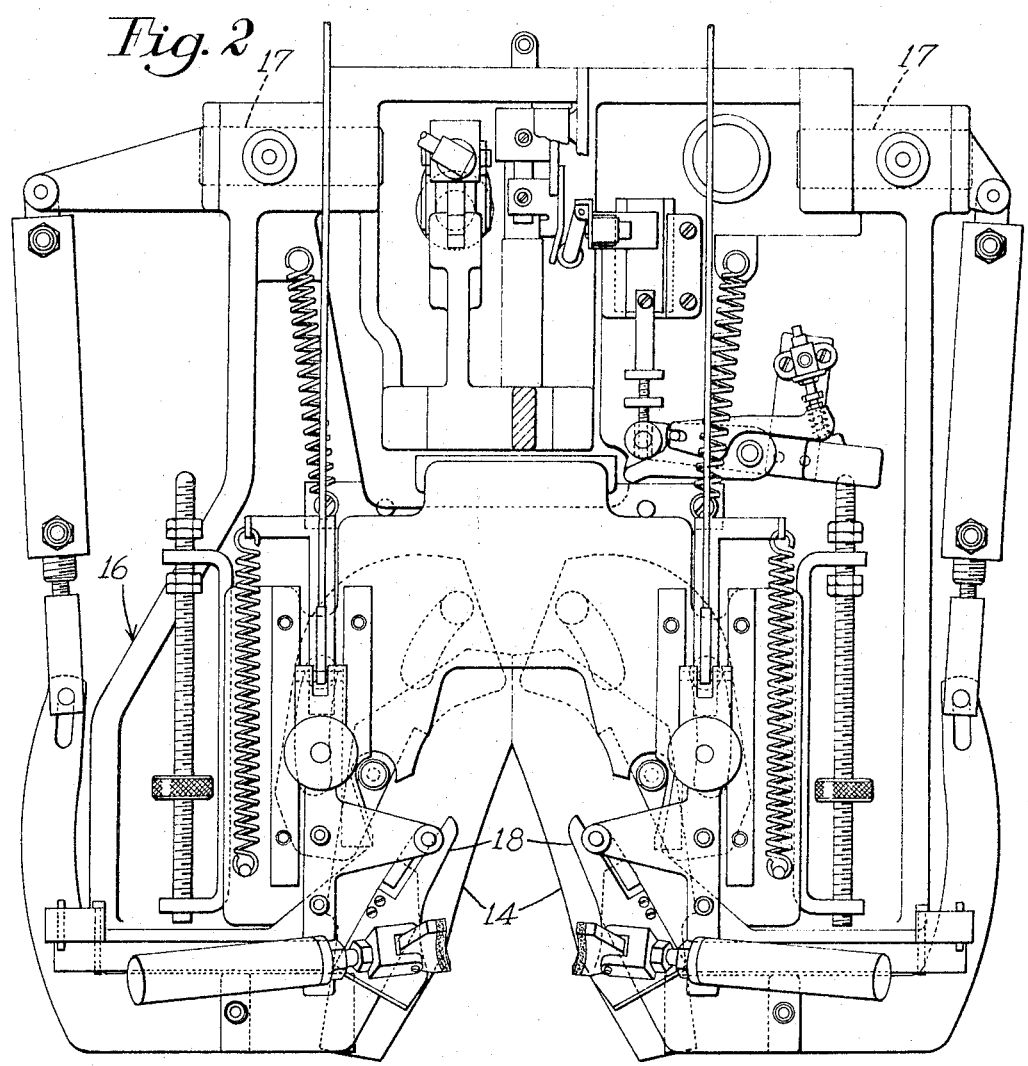
FIG. 2 is a plan view of a portion of the machine showing particularly the upper wiping instrumentalities.

The machine illustrated in the drawings includes a shoe rest 2 (FIGS. 3 and 4) which supports the bottom of a last on which an upper is loosely assembled to position the last heightwise as well as to support it against the action on the upper of a toe gripper 4, a pair of side grippers 6 and a pair of ball grippers 8. For positioning lengthwise and widthwise, the forepart of the shoe is placed against a toe distributor 10, and a pair of side distributors 12, which also act on the shoe upper to distribute the material evenly as it is wiped heightwise around the forepart and widthwise over the bottom of the shoe by a pair of forepart wipers 14 (FIG. 2). The wipers are carried on a head 16 pivoted at 17 for swinging heightwise movement relative to the shoe in two stages. Initially the head 16 is in a raised open position as seen in FIG. 1, so that the last may be placed on the support 2 and the upper inserted in the grippers. After the grippers exert a preliminary pull on the upper, the wiper head is swung down to a gaging position where the outline of the wipers 14 overlies the outline of the last and act as a visual gage to enable the operator to determine whether the upper is properly located on the last. At this time a heel clamp 30 is moved against the heel end of the shoe to support the shoe against subsequent action of the wipers and to gage the size of shoe for a further purpose which will appear.

During the second stage of wiper operation, the wipers are moved downwardly from the gaging position to a position where their upper surfaces are in the same plane as the bottom of an insole on the last bottom. Thereafter the wipers are moved widthwise and heelwardly to wipe the upper inwardly over the forepart margin of the insole. For wiping the upper over the insole at the ball region the machine is provided with ball wipers 18 overlying the forepart wipers 14 and shaped as shown in FIG. 2. The ball wipers and their operating mechanisms are similar to those illustrated in U.S. Patent No. 3,226,745, granted January 4, 1966 on application of Gerard J. Marquis. Since the construction of the ball wipers forms no part of the present invention their operation will not be treated in detail herein. It should be sufficient for purposes of explanation of the present invention to state that the ball wipers are adjustable lengthwise of a shoe to be operated upon according to the size of such shoe as determined by movement of the heel clamp 30 in a manner fully explained in said patent. The foregoing is intended to describe generally one typical lasting machine to which the invention may be applied and it should be understood that the invention is applicable to other machines where thermoplastic adhesive is to be activated at the ball region of a shoe bottom.

Figure 3:
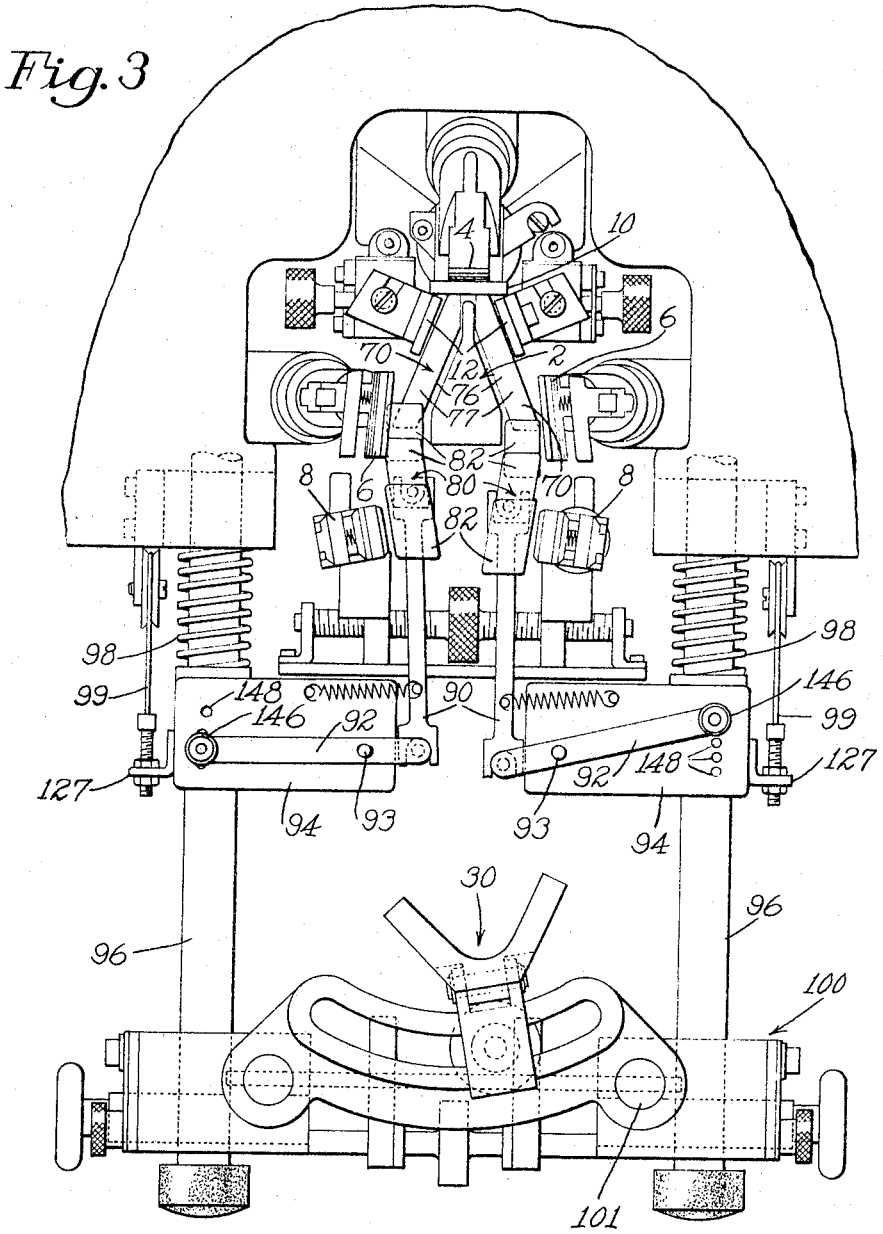
FIG. 3 is a plan view of a portion of the machine underlying the mechanisms shown in FIG. 2 and illustrating particularly the adhesive activating mechanisms.

For securing the margin of the shoe upper to be lasted by the wipers 14 and 18 the margin of the insole bottom is precoated with thermoplastic adhesive which has been allowed to solidify before the shoe is placed in the machine. Thus, before the upper is wiped inwardly over the insole bottom the adhesive must be activated by heat to render it molten around the forepart and ball regions. To this end, the shoe rest 2, which initially supports and positions the shoe during upper pulling and adhesive activation, includes a member 50 (FIG. 4) on which rests the central forepart portion of the insole bottom of a shoe to be operated on. The member 50 is carried by a bracket 52 fixed on the upper end of a post 56 mounted for heightwise sliding movements in suitable bearings in the machine frame (not shown). The lower end of the post has fixed thereto a piston of a cylinder (not shown) secured to a lower portion of the machine frame. When the machine is at rest, the member 50 is maintained in its uppermost position as seen in FIG. 4. The post 56 at its upper end also acts as a piston on which is slidably mounted a cylinder 58 having ports 60 and 61. During the adhesive activating portion of the machine cycle compressed air is admitted through port 60 holding the cylinder in its uppermost position shown in FIG. 4. The upper end of the cylinder is provided with lugs 62, 64 suitably bored to receive an upright rod 66 fixed in the lug 62 and a pair of rods 68 slidably received for heightwise movement in the lugs 64. At its upper end, the rod 66 pivotally supports the toe end of a forepart activating unit 70 which is V-shaped as shown in FIG. 3. The heelwardly extending legs of the unit 70 are carried on the upper ends of the rods 68 (FIG. 4) with springs 72 compressed between the unit 70 and the cylinder lugs 64 yieldingly holding the heel end of the unit in a heightwise position determined by stop nuts engaging the underside of lugs 64. The unit 70 is provided with plates 76 having upper activating surfaces 77 which may be shaped to suit the average marginal contour of the forepart of the shoe bottom of a variety of sizes and styles of shoes. Heaters 78 are provided in unit 70 to maintain the plates 76 and thus the activating surfaces 77 at a temperature suitable for activating precoated thermoplastic adhesive on the margin of the forepart of an insole bottom of the shoe to be lasted.

For activating the precoated adhesive on the margin of the ball regions of the insole, heated surfaces 80 are arranged to overlap and extend heelward from the activating surfaces 77 of the unit 70. It should be understood that the surfaces 80 need not overlap or be associated with a forepart activating surface as on the unit 70 since it may be desirable to activate adhesive only at the ball regions. The surfaces 80 are formed by a series of flexible plates 82 each having an end overlapping its adjacent associated plate. Each plate is secured on the upper end of a block 83 provided with a heater 84. As best seen in FIG. 4, the blocks 83 are of different heights and angularity relative to each other and to the activating surface 77 so the surfaces formed by the plates 82 have curved contours generally conforming to the lengthwise contours of the shoe bottom at the ball region. As seen in FIG. 4, the blocks 83 each have bars 86 depending therefrom which are connected by pivotal cross links 87 to each other and to a similar bar 88 rotatably mounted on the heel ends of the legs of the unit 70 so that movement of one block imparts equal movements to the associated blocks relative to the heel end of the unit 70. Thus lengthwise movement of any bar 86 and associated block 83 causes the overlapping plates 82 to slide over each other and over the surface 77, i.e., lengthwise of the shoe, to lengthen or shorten the surfaces 80 as well as to locate the heightwise curvature of the surfaces relative to the toe end of the insole. As shown in FIGS. 3 and 4 the surfaces 80 are extended to their maximum length and the curvature thereof spaced from the toe end of plate 76 suitably to operate on the longest size shoe that the machine is capable of processing.

The location of the ball regions of different size shoes varies relative to the toe ends of the shoes. Thus, the location where heightwise curvature of the ball region begins as well as the length of curvature, varies depending on shoe size. Accordingly, provision is made to adjust the location and length of the activating surfaces 80 to conform to the shoe in the machine. To this end, one of the bars 86 at each side is connected by a link 90 to one end of an adjustable lever 92 (FIG. 3) pivoted at 93 on a slide 94. The slides 94 at opposite sides of the machine are carried on rods 96 which in turn are also mounted for lengthwise sliding movement in suitable bearings in the machine frame as best seen in FIG. 1. Springs 98 interposed between the machine frame and one side of the slides urge the slides heelward to positions limited by flexible cables 99 anchored at one end on the slides. At their heelward ends the rods 96 are fixed to a composite bracket 100 carrying upright posts 101 on which the heel clamp 30 is adjustably mounted.

At its toe end one of the rods 96 is connected by a link 102 (FIG. 1) to the upstanding arm of a bell crank lever 104 which is pivoted at 106 on a bracket 108 secured to the machine frame. The other arm of the lever is connected to a piston rod 110 extending down from a cylinder 112 pivoted on lugs depending from the machine frame. Admission of air to the upper end of the cylinder causes the bell crank lever to be rotated clockwise from the position seen in FIG. 1 to move the heel rest 30 against the heel end of the shoe. As referred to above, the heel clamp 30 also acts as a gage which measures the size of the shoe in the machine. For utilizing the movement of the heel clamp 30 as a gaging movement to cause the activating surfaces 80 to be adjusted according to shoe size, movement of the heel clamp is proportionally imparted to the cable 99. To this end the bracket 100 has two depending lugs 114 which through links 116 are connected to the upper ends of levers 118. Each lever is pivoted at 120 on a bracket 122 secured to the machine frame. Another arm 123 of the lever is connected to a cable 124 for setting the ball wipers as described in said application and a lug 125 on the arm is connected to one end of the cable 99. The latter cable is directed over a pulley 126 and thence to a bracket 127 on the associated slide 94. The ratio of the relative lengths of the arms of the lever 118 is equal to the ratio by which the spacing of the ball region from the heel end of the shoe varies according to shoe size. It may be seen in FIG. 1 that link 116 is provided with a slot 128 so that no movement of the heel clamp is imparted to the lever 118 until the end of the slot engages the pin in the upper end of lever 118. At that point, the heel rest is adapted to engage the heel end of the largest size shoe that would be operated upon by the machine. If such a size shoe were to be operated upon, no adjustment of the activating surfaces 80 would be required. However, for smaller size shoes, continued movement of the heel clamp 30 before engagement with the heel end of a shoe would cause lengthwise movement to be imparted to one of the blocks 83 at each side to shorten the length of surfaces 80 through levers 118, cables 99, slides 94, levers 92, and links 90.

The widths of different size shoes also vary according to size. In addition, the widthwise disposition of the ball region differs depending on whether the shoe is right or left foot. Accordingly, provision is made to vary the widthwise disposition of surfaces 80 as lengthwise size adjustment is made. To this end one of the bars 86 of the blocks 83 at each side is provided with a headed button 130 (FIGS. 4–6) which rests on a surface 132 of a guide member 134. Each button is also received in a T-slot 136 in the guide member which is pivoted on a pin 138 on a plate 139. Each of the guide members 134 is provided with an arm 140 pivotally connected to a block 142 having a handle 143. The block has a lug 144 extending toeward between two stop screws 145 carried by the plate 139 and which limit manual adjustment of the block. As seen in FIG. 5, the T-slots in the guide members 134 are angularly disposed relative to the center line of the forepart of a shoe to be operated upon to guide the buttons 130 along gradient lines converging toward the center line as the button is moved toewardly during its size setting movement. The angles that the T-slots of the guide members form with respect to the center line of the shoe differ on opposite sides so that the activating surface 80 at one side will be moved widthwise closer to the center line of the shoe than the other depending on whether the block 142 is set for operation on a right or left shoe. As seen in FIG. 5 the block is set for a right shoe. By moving the block to the right until the lug 144 engages the other stop screw 145, the angular disposition of the guides 134 will be inverted so the surfaces may be adjusted for operating on a left shoe.

In addition to the heightwise curvatures of the ball regions of the shoe at opposite sides occupying different widthwise positions, they also occupy different lengthwise positions depending on whether the shoe is right or left foot. For this reason, the surfaces 80 at opposite sides are adjusted differently as indicated by the different settings of the levers 92 as shown in FIG. 3 where the levers are set for operation on a right shoe. For adjusting, each of the levers 92 is provided with a spring pressed handle 146 having detents adapted to be engaged in any one of a series of holes 148 in the associated slide 94. For operating on a left shoe the positions of the levers 92 are reversed.

Thus during the pulling and upper adjusting portion of the machine cycle as described in detail in said Bowler et al. patent the bottom central portion of the forepart of the insole of the shoe is supported on the member 50 of the shoe rest 2. The adhesive coated margin of the forepart of the insole is activated by engagement with the heated surface 77 of the unit 70. The coated margins of the ball region of the insole bottom are activated by engagement with the heated surfaces 80 of the ball activating units which have been located and adjusted according to shoe size as controlled by movement of the heel clamp 30. The ball activating units also were previously selectively adjusted according to whether the shoe to be operated upon was right or left by setting the levers 92 and the handle 143 in their proper positions. During the second stage of the machine cycle the wiper head 16 is moved downwardly to wipe the upper over the forepart of the last and thereafter inwardly to wipe the upper over the insole bottom as described in said patent. Also during the latter part of the second stage the ball wipers 18 are moved inwardly to wipe the upper over the ball region of the insole bottom as described in said Marquis patent. Since the forepart activating unit 70 and the ball activating units are in the path of inward movements of the forepart and ball wipers, provision is made to retract these units away from the shoe bottom at this time. To this end compressed air or other fluid is admitted to the cylinder 58 through the port 61 while fluid is exhausted from the port 60. This causes the cylinder to be moved downwardly along the post 56 retracting the forepart activating unit 70 away from the insole bottom. The ball activating units are similarly retracted at this time as will now be described.

The plate 139 on which the guide members 134 are pivoted is provided on its underside with cylindrical bosses 150 which are received in mating depressions 152 in a member 154. The member is fixed on the upper end of a piston rod 156 projecting from a cylinder 158. The cylinder is a single acting type in which upward movement of the piston rod is caused by admission of fluid to the lower end of the cylinder through a pipe 160 to raise and hold the plate 139 and hence both ball activating units in insole engaging position as seen in FIG. 4. To retract the units while the upper is wiped over the insole, fluid is exhausted from pipe 160 and a spring (not shown) in the cylinder acts to retract piston rod 156.

Having thus described my invention what I claim as novel and desire to secure by Letters Patent of the United States is:

1. In a shoe lasting machine having wipers arranged to wipe the margin of an upper on a last inwardly over the bottom of an insole coated with heat activatable adhesive for securing the upper margin to the insole bottom at the ball region of a shoe,
   a support for the shoe including a member engagable with the forepart of the insole, and
   means for heat activating the adhesive at marginal portions of the insole bottom at opposite sides of the ball region comprising,
   substantially continuous heated surfaces arranged to engage said marginal portions at opposite sides widthwise of the insole, said surfaces each being formed by flexible plates having overlapping ends and disposed to conform substantially to the lengthwise contour of the ball region of the insole bottom,
   and means carrying each of said plates for movement lengthwise of the shoe into greater or lesser overlapping relationship and relative to the toe end of the ball region for extending and shortening said surfaces according to the size of said shoe.

2. A machine according to claim 1, in which the plates are heat conductive and the carrying and moving means for the plates include
   heated blocks each disposing the individual plate at positions differing in the direction of the height dimension of the shoe whereby the contour of the surfaces formed by the plates conforms substantially to the lengthwise contour of the ball region of the shoe bottom.

3. A machine according to claim 2, in which the heated blocks are interconnected to each other by linkage whereby lengthwise movement of any block imparts substantially equal movement to its associated blocks.

4. A machine according to claim 3, in which guide means are provided for at least one block at each side of the shoe for guiding the block along a gradient line converging toewardly toward the center line of the forepart of the shoe as the block is moved lengthwise of the shoe for moving the plates widthwise according to shoe size as the blocks are moved lengthwise according to shoe size.

5. A machine according to claim 1, having means for locating the shoe in a predetermined position lengthwise of the support,
   a gage mechanism for measuring the size of said shoe,
   and means controlled by the gage mechanism for moving the plate carrying means lengthwise of the shoe proportionally according to its size.

6. A machine according to claim 4, having means for locating the shoe in a predetermined position lengthwise of the support, a gage mechanism for measuring the size of said shoe, and means controlled by the gage mechanism for moving said one block lengthwise of the shoe along said gradient line proportionally according to its size for adjusting the length of said surfaces and their widthwise disposition according to the size of said shoe.

7. A machine according to claim 1, having wipers arranged also to wipe the margin of the upper widthwise over the bottom of the insole at the forepart, and a heated member having surfaces engaging and corresponding substantially to the coated marginal portions of the forepart of the insole.

8. A machine according to claim 7, in which the continuous surfaces extend heelwardly from said member and the end of the plates adjacent said member overlap the adjacent surfaces of said member.

9. A machine according to claim 3, having wipers arranged to wipe the margin of the upper widthwise over the bottom of the insole at the forepart, and a heated member having surfaces engaging and corresponding substantially to the contours of the coated marginal portions of the forepart of the insole, said continuous surfaces extending heelwardly from said member and having the end of the plates adjacent said member overlapping the adjacent surfaces of said member, said block carrying said adjacent plate being also interconnected with said member whereby the blocks are moved lengthwise relative to said member.

10. A machine according to claim 1, having means for moving said continuous surfaces bodily heightwise relative to the shoe into and out of engagement with the insole bottom whereby the plates after activating said adhesive are movable away from the insole bottom before inwiping movements of the wipers cause the upper margins to be wiped over and secured to the insole bottom by the activated adhesive.

11. A machine according to claim 4, in which the guide means also support the blocks against heightwise movement and means is provided for moving the guide means in directions heightwise relative to the shoe for moving the continuous surfaces out of engagement with the insole after the adhesive is activated and before inwiping movements of the wipers cause the upper margins to be wiped over and secured to the insole bottom by the activated adhesive.

12. A machine according to claim 1, having means for varying the length of either of said surfaces independently for operating on right and left shoes.

13. A machine according to claim 3, having means for selectively varying the lengthwise position of said blocks independently at opposite sides of the shoe for varying the length of said surfaces for operating on right and left shoes.

14. A machine according to claim 4, in which the gradient lines of said guide means have dissimilar converging angles whereby said surfaces are disposed in different widthwise positions during their lengthwise size setting for operating on right and left shoes, and having selective means for setting said guide means to invert the disposition of the gradient lines for operating alternately on right and left shoes.

References Cited by the Examiner

UNITED STATES PATENTS

| | | | |
|---|---|---|---|
| 1,110,315 | 9/1914 | Eldridge | 12—12 |
| 2,224,146 | 12/1940 | Eastman | 12—8.8 |
| 3,082,449 | 3/1963 | Bowler et al. | 12—12 |
| 3,164,852 | 1/1965 | Bowler et al. | 12—10.5 |

JORDAN FRANKLIN, *Primary Examiner.*

PATRICK D. LAWSON, *Assistant Examiner.*